(12) United States Patent
Croghan et al.

(10) Patent No.: US 9,585,369 B2
(45) Date of Patent: Mar. 7, 2017

(54) COLLAR/LEASH COMBINATION RESTRAINT AND METHOD OF USE

(71) Applicants: Margaret Croghan, Burke, VA (US); Connor Croghan, Burke, VA (US)

(72) Inventors: Margaret Croghan, Burke, VA (US); Connor Croghan, Burke, VA (US)

(*) Notice: Subject to any disclaimer, the term of this patent is extended or adjusted under 35 U.S.C. 154(b) by 108 days.

(21) Appl. No.: 14/520,561

(22) Filed: Oct. 22, 2014

(65) Prior Publication Data
US 2016/0113244 A1 Apr. 28, 2016

(51) Int. Cl.
*A01K 27/00* (2006.01)

(52) U.S. Cl.
CPC .......... *A01K 27/001* (2013.01); *A01K 27/003* (2013.01)

(58) Field of Classification Search
CPC ... A01K 27/002; A01K 27/003; A01K 27/004
USPC .................................. 119/769, 792
See application file for complete search history.

(56) References Cited

U.S. PATENT DOCUMENTS

| | | | | |
|---|---|---|---|---|
| 2,889,807 A * | 6/1959 | Beebe | ................ | A01K 27/004 119/794 |
| 4,413,589 A * | 11/1983 | Bielen, Jr. | ............ | A01K 27/004 119/792 |
| 4,903,638 A * | 2/1990 | Lacey | ................ | A01K 27/005 119/776 |
| 5,074,011 A * | 12/1991 | Carlson | ................ | A01K 27/00 24/170 |
| 5,429,075 A * | 7/1995 | Passarella | ............ | F21V 33/008 119/795 |
| 5,551,379 A * | 9/1996 | Hart | ................ | A01K 27/003 119/771 |
| 5,660,146 A * | 8/1997 | Sporn | ................ | A01K 27/002 119/792 |
| 5,682,840 A * | 11/1997 | McFarland | ........ | A01K 27/002 119/792 |
| 6,694,923 B1 * | 2/2004 | Fouche | ............ | A01K 27/005 119/792 |
| 7,284,504 B1 * | 10/2007 | Purschwitz, Jr. | .... | A01K 27/002 119/792 |
| 7,389,750 B1 * | 6/2008 | Rogers | ................ | A01K 27/005 119/792 |
| 2009/0071417 A1 * | 3/2009 | Simmensen | ........ | A01K 27/001 119/793 |
| 2009/0255486 A1 * | 10/2009 | Thompson | ........... | A01K 27/006 119/794 |
| 2011/0277700 A1 * | 11/2011 | Friedland | ................ | A01K 1/04 119/792 |

* cited by examiner

*Primary Examiner* — Danielle Clerkley
(74) *Attorney, Agent, or Firm* — LeonardPatel PC

(57) ABSTRACT

A collar/leash combination restraint system may include a hollow connector affixed to a collar. The leash is wrapped around a dog's tail and fed through the hollow connector. This forms a pulley configuration that utilizes the weight and momentum of the dog to leverage control of the animal when dog begins to pull its human walker.

3 Claims, 7 Drawing Sheets

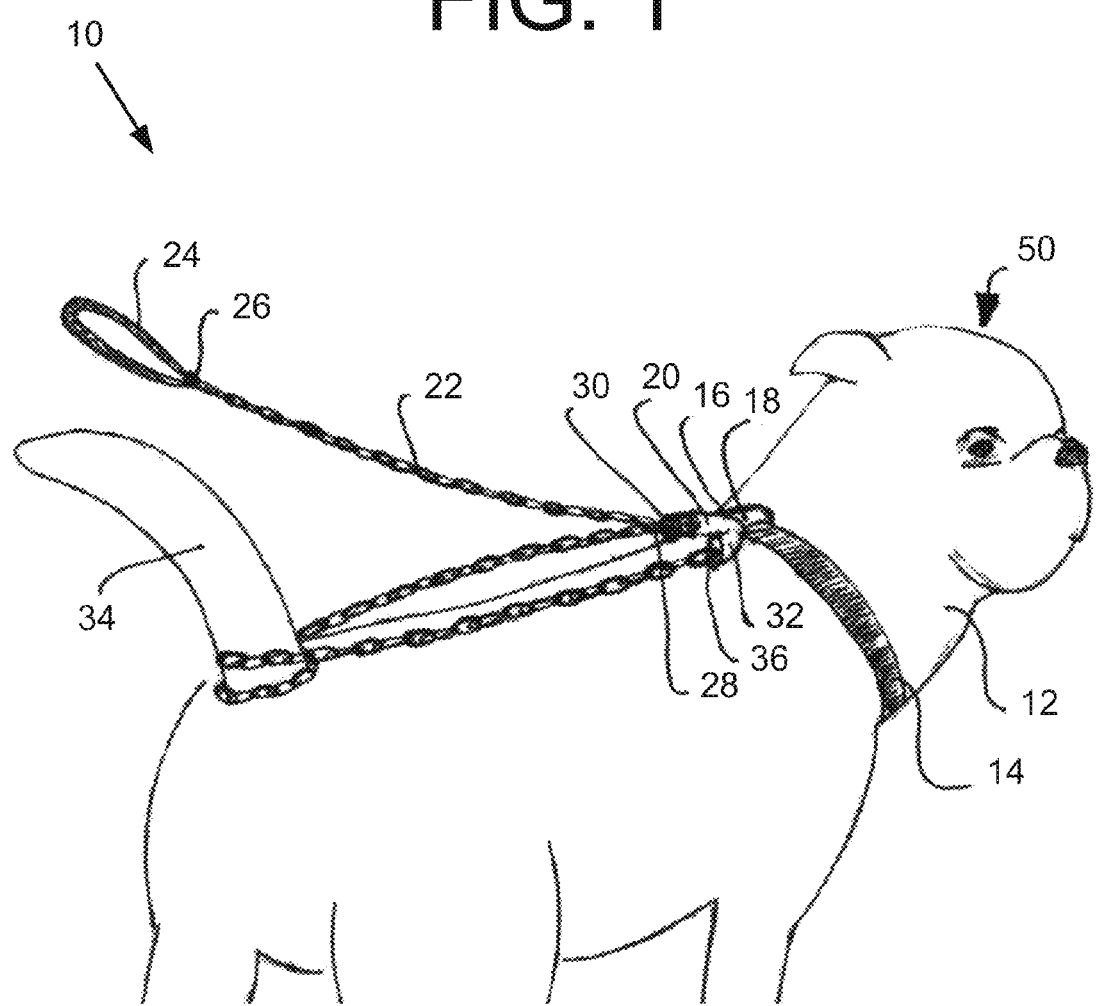

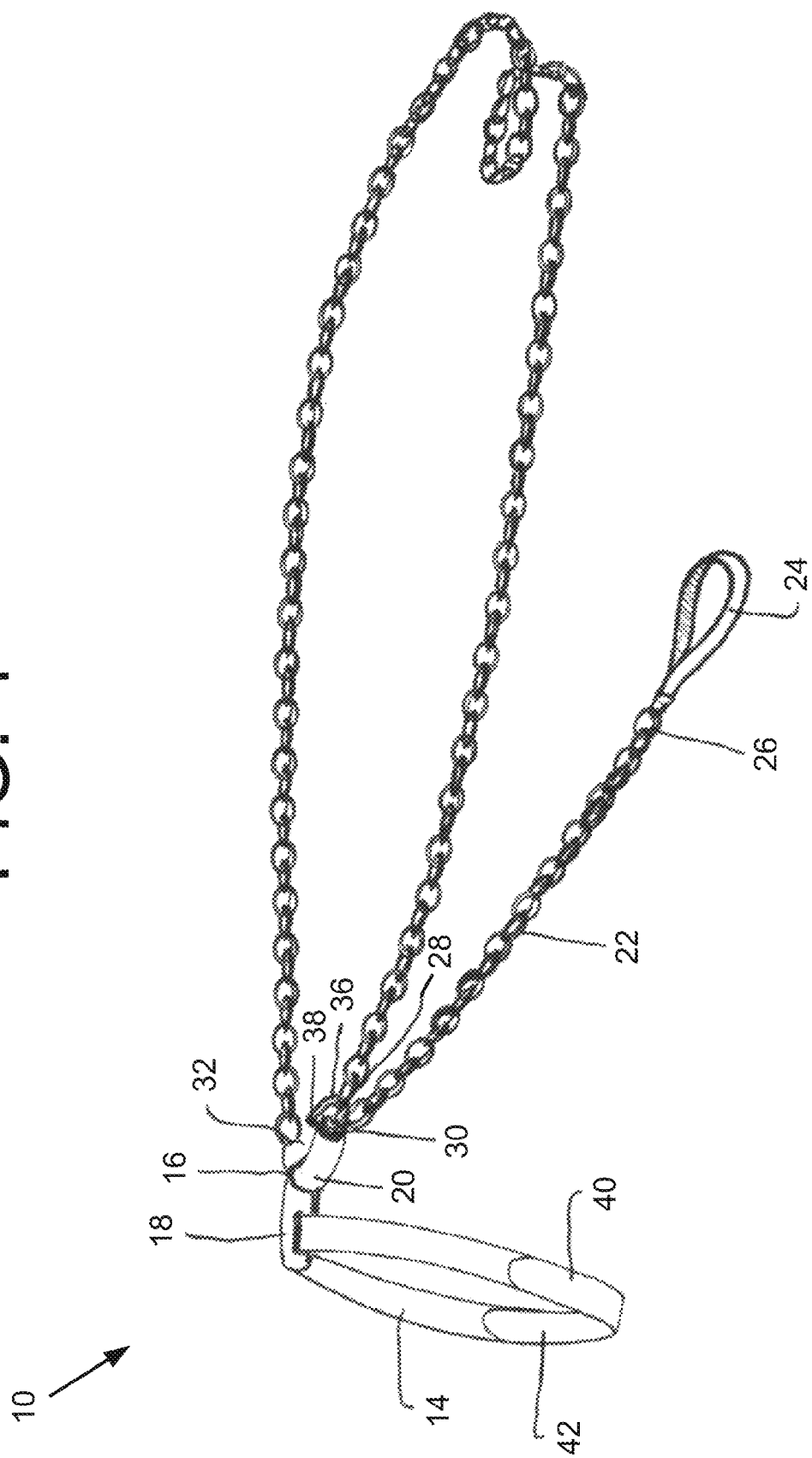

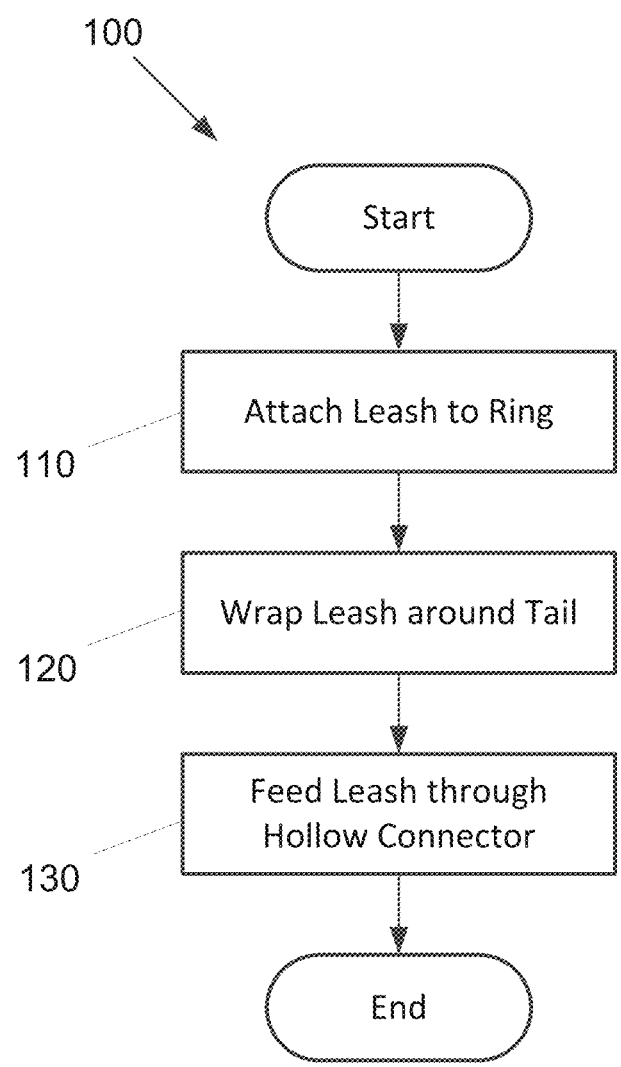

COLLAR/LEASH COMBINATION RESTRAINT AND METHOD OF USE

FIELD

The present invention generally relates to animal restraints, and more particularly, to a collar/leash combination restraint for an animal, such as a dog.

BACKGROUND

Dogs of many breeds often pull their owners when being walked. Larger breeds may be capable of using their strength to overpower their human walkers or even drag a child. Typically, when walking a dog, one frequently uses only the right or left arm against the strength of the animal. This may cause a tug-of-war affect between the human walker and the dog. Excessive or sudden pulling may result in injuries to the wrist, arm, and/or shoulder.

To potentially reduce the risk of such injuries, choke collars and harnesses have been employed. While these devices may be somewhat effective in the short term, they do not prevent a dog from pulling, particularly for strong-willed animals. Furthermore, the choke collars may restrict the animal's breathing as the dog continues to pull. This may build the strength and stamina of the animal, enabling the dog to pull even harder over time and exacerbating the problem.

SUMMARY

Certain embodiments of the present invention may provide solutions to the problems and needs in the art that have not yet been fully identified, appreciated, or solved by conventional animal restraint technologies. For example, in some embodiments, a collar/leash combination restraint system includes a hollow connector affixed to a collar. The leash is wrapped around a dog's tail and fed through the hollow connector. This forms a pulley configuration that utilizes the weight and momentum of the dog to leverage control of the animal when dog begins to pull its human walker.

In an embodiment, an apparatus includes a hollow connector affixed to a collar. The hollow connector is configured to receive a leash within a hollow portion of the hollow connector.

In another embodiment, an apparatus includes a hollow connector configured to receive a leash therewithin and a collar attachment connector operably connected to the hollow connector. The collar attachment connector is configured to be secured to a collar.

In yet another embodiment, a system includes a collar and a hollow connector removably or unremovably affixed to the collar. The system also includes a ring either directly or indirectly attached to the hollow connector and a leash attached to the ring and fed through the hollow connector.

BRIEF DESCRIPTION OF THE DRAWINGS

In order that the advantages of certain embodiments of the invention will be readily understood, a more particular description of the invention briefly described above will be rendered by reference to specific embodiments that are illustrated in the appended drawings. While it should be understood that these drawings depict only typical embodiments of the invention and are not therefore to be considered to be limiting of its scope, the invention will be described and explained with additional specificity and detail through the use of the accompanying drawings, in which:

FIG. 1 is a perspective view illustrating a collar/leash combination restraint system on a dog, according to an embodiment of the present invention.

FIG. 4 is a perspective view illustrating the collar/leash combination restraint system, according to an embodiment of the present invention.

FIG. 6 is a flowchart illustrating a process for employing a collar/leash combination restraint system, according to an embodiment of the present invention.

DETAILED DESCRIPTION OF THE EMBODIMENTS

Figure 2A:
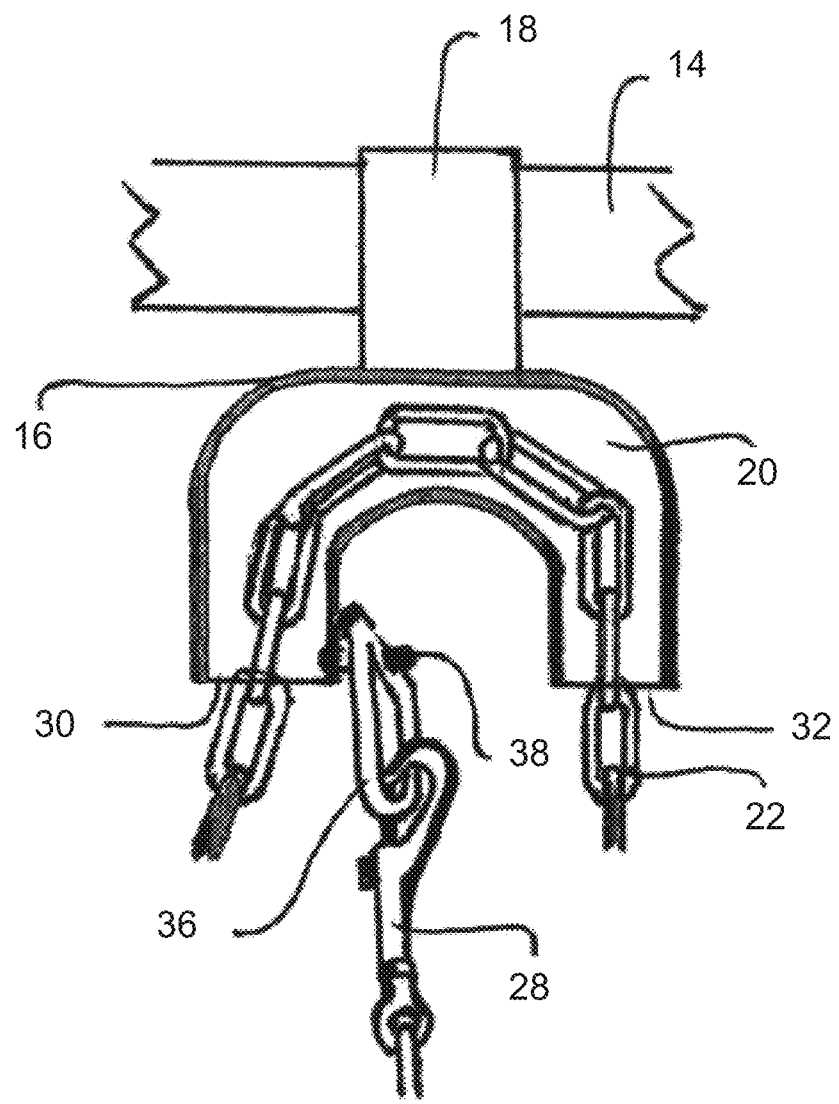
FIG. 2A is a top cutaway view illustrating a Y connector, according to an embodiment of the present invention.

Some embodiments of the present invention pertain to a collar/leash combination restraint system that includes a hollow connector affixed to a collar. The leash is wrapped around a dog's tail and fed through the hollow connector. This forms a pulley configuration that utilizes the weight and momentum of the dog to leverage control of the animal when dog begins to pull its human walker.

FIG. 1 is a perspective view illustrating a collar/leash combination restraint system 10 on a dog 50, according to an embodiment of the present invention. However, restraint system 10 may be used for any other suitable animal in some embodiments, such as cats. Positioned around the circumference of the neck 12 of dog 50 is a collar 14. Collar 14 may be made from any suitably durable material, such as rubber, nylon, leather, etc., for this application. In some embodiments, collar 14 may be a standard off-the-shelf collar. In other embodiments, collar 14 may be custom-made for this particular application. In most conventional collars, a metal ring is attached to the center of the collar for accessibility to clip a standard leash clasp. Upon walking the dog with a typical clasp leash and collar, the human walker must rely solely on his or her own strength to control the dog.

Collar/leash combination restraint system 10 is, essentially, a pulley leash assembly that utilizes the weight and momentum of dog 50 to leverage control of the animal when dog 50 begins to pull its human walker. Collar/leash combination restraint system 10 includes a hollow Y connector 16 made from a suitable material, such as a hard plastic, metal, hard leather, etc. A straight end 18 of Y connector 16 is bonded, or otherwise removably or non-removably attached, to collar 14 and rests on the back of dog 50 at the base of the neck 12. However, in some embodiments, rather than including a straight end, a suitable connector may be affixed directly to the hollow portion of hollow connector 16, creating a "U" shape instead of a "Y" shape. A hollow U end 20 of Y connector 16 points towards the tail 34 of dog 50 in this embodiment. However, in some embodiments, the hollow portion of Y connector 16 may have a straight pipe shape, a "W" shape, or any other suitable shape, as would be understood by one of ordinary skill in the art. The inside of U end 20 may have a coating (e.g., a silicon coating, Teflon™, or any other suitable low friction coating) and/or be smooth so as to present low friction to a leash.

Leash 22 may be a standard dog leash, such as a chain leash, with a handle 24 made from nylon, leather, rubber, etc. In some embodiments, leash 22 may be unremovably affixed to Y connector 16, collar 14, or both. Handle 24 is attached to leash 22 by a metal O ring 26 in this embodiment. However, O ring 26 may be made from any suitable material. Furthermore, in other embodiments, such as with fabric leashes, O ring 26 may not be present at all. The opposite end of leash 22 has a clasp 28. Leash 22 is fed through U end 20 of Y connector 16 from left entry side 30 and exits out of right exit side 32. Leash 22 is wound around tail 34 of dog 50 two times in this embodiment. However, any desired number of times may be used. Leash 22 is then brought back up to Y connector 16 and clipped to a ring 36 using clasp 28. In this embodiment, ring 36 is a metal D ring. However, ring 36 may have any desired shape and may be made from any suitable material. The pulley assembly of collar/leash combination restraint system 10 may be applied with the oppositely described components for left-handed dog walkers or those who prefer to walk with the dog beside them on their left side.

Figure 2B:
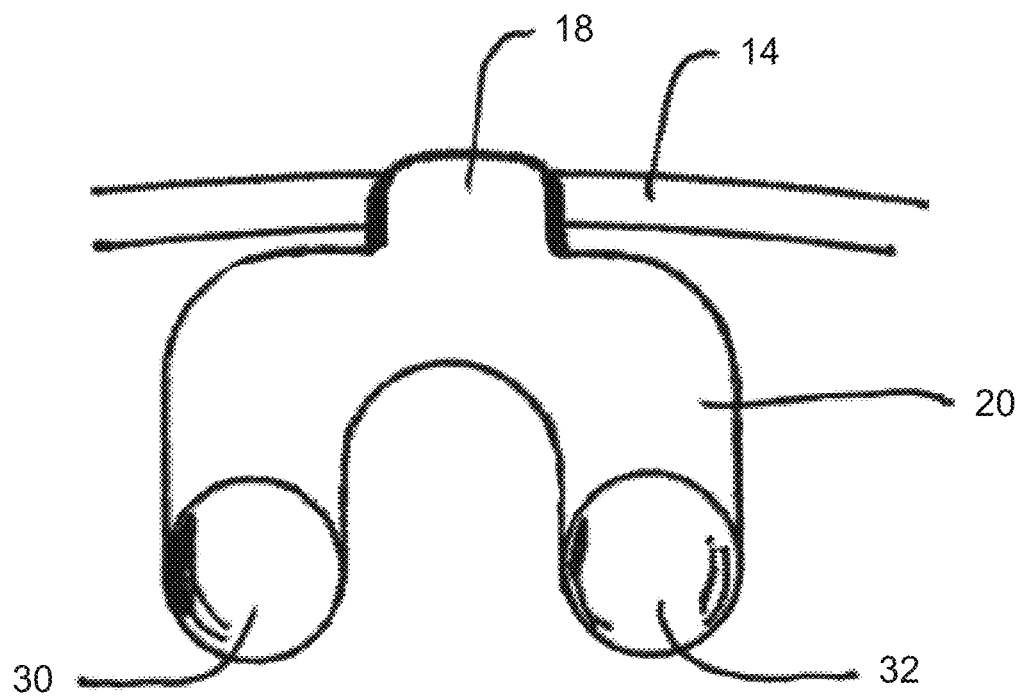
FIG. 2B is a top view illustrating the Y connector, according to an embodiment of the present invention.

FIGS. 2A and 2B illustrate top cutaway and non-cutaway views of Y connector 16, respectively, according to an embodiment of the present invention. U end 20 of Y connector 16 is hollow and acts as a permanent track for leash 22 to travel through cleanly. This facilitates the pulley system of collar/leash combination restraint system 10. O ring 26 and clasp 28 prevent leash 22 from falling out of U end 20 when not in use. However, in some embodiments, such as when non-chain leashes are used, O ring 26 may not be present. Ring 36 may be a typical metal ring found on most dog collars. Ring 36 indirectly attaches to U end 20 of Y connector 16 by a metal post 38 extending from the inner left side of U end 20 in this embodiment. However, in some embodiments, ring 36 attaches directly to Y connector 16. Furthermore, any suitable material may be used for post 38.

Figure 3A:
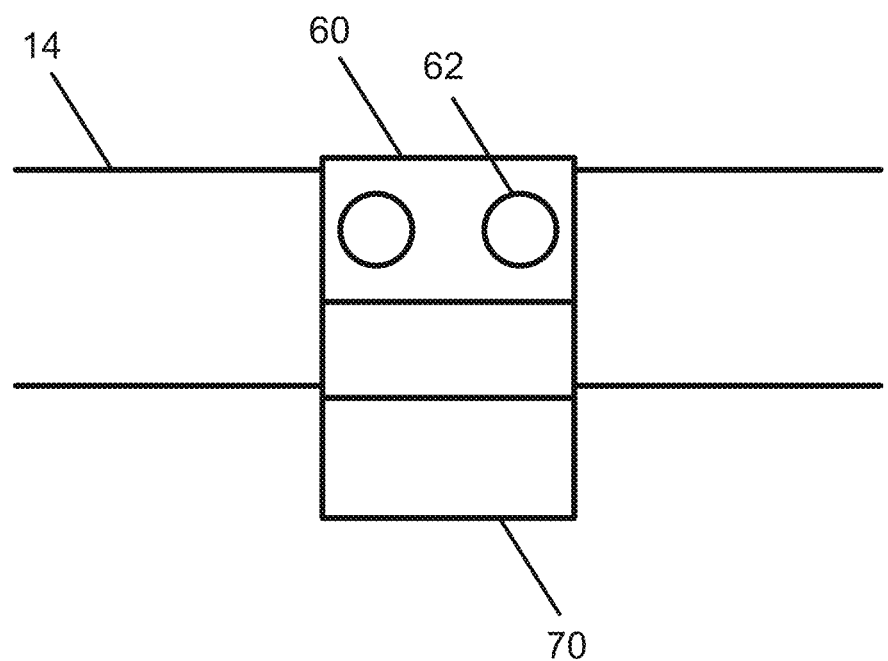
FIG. 3A is a top view illustrating a leash attachment connector affixed to a collar, according to an embodiment of the present invention.
Figure 3B:
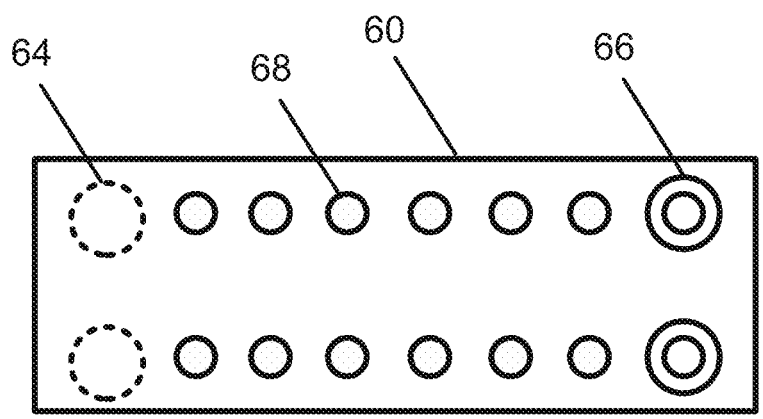
FIG. 3B is an opened view illustrating the leash attachment connector, according to an embodiment of the present invention.

FIGS. 3A and 3B illustrate a collar attachment connector 60, according to an embodiment of the present invention. An advantage of this configuration is that the pulley system may be employed on most conventional collars without modification. Collar attachment connector 60 may be constructed from any suitable material, such as leather, rubber, nylon, etc. Collar attachment connector 60 is attached to a hollow connector 70. In some embodiments, hollow connector 70 may be Y connector 16 of FIGS. 1, 2A, 2B, 4, and 5. Hollow connector 70 may have any desired shape, and collar attachment 60 may be attached to a hollow or solid portion thereof.

Collar attachment connector 60 includes a snap fastener 62 that removably secures leash attachment connector to collar 14. Female snaps 64 and male snaps 66 secure collar attachment connector 60 along the x- and z-axes with respect to collar 14. However, fasteners of any desired configuration may be used, such as buttons, hooks, holes and loops, etc. Any number of fasteners may be used in order to accommodate different collar thicknesses.

It may be desirable for leash attachment connector 60 to be prevented or restrained from moving along the y-axis (i.e., laterally) with respect to collar 14. Thus, restraint members 68 may be included. Restraint members 68 may be pointed to secure into fabric mesh collars, for example. Restraint members 68 may also be nubs of a higher friction material, such as certain rubbers. However, any desired restraint members, or combination of different types of restraint members, may be used.

FIG. 4 is a perspective view illustrating collar/leash combination restraint system 10 without dog 50, according to an embodiment of the present invention. Leash 22 is one continuous chain from handle 24 to clasp 28. In some embodiments, it may require up to three lengths of leash 22 to support small, medium, and large dog breeds. Small dogs may require four to five feet of length from leash 22 extending from handle 24 to left entry side 30 of U end 20. Medium to large breeds may only require two to three feet of the same extension in some embodiments.

Figure 5:
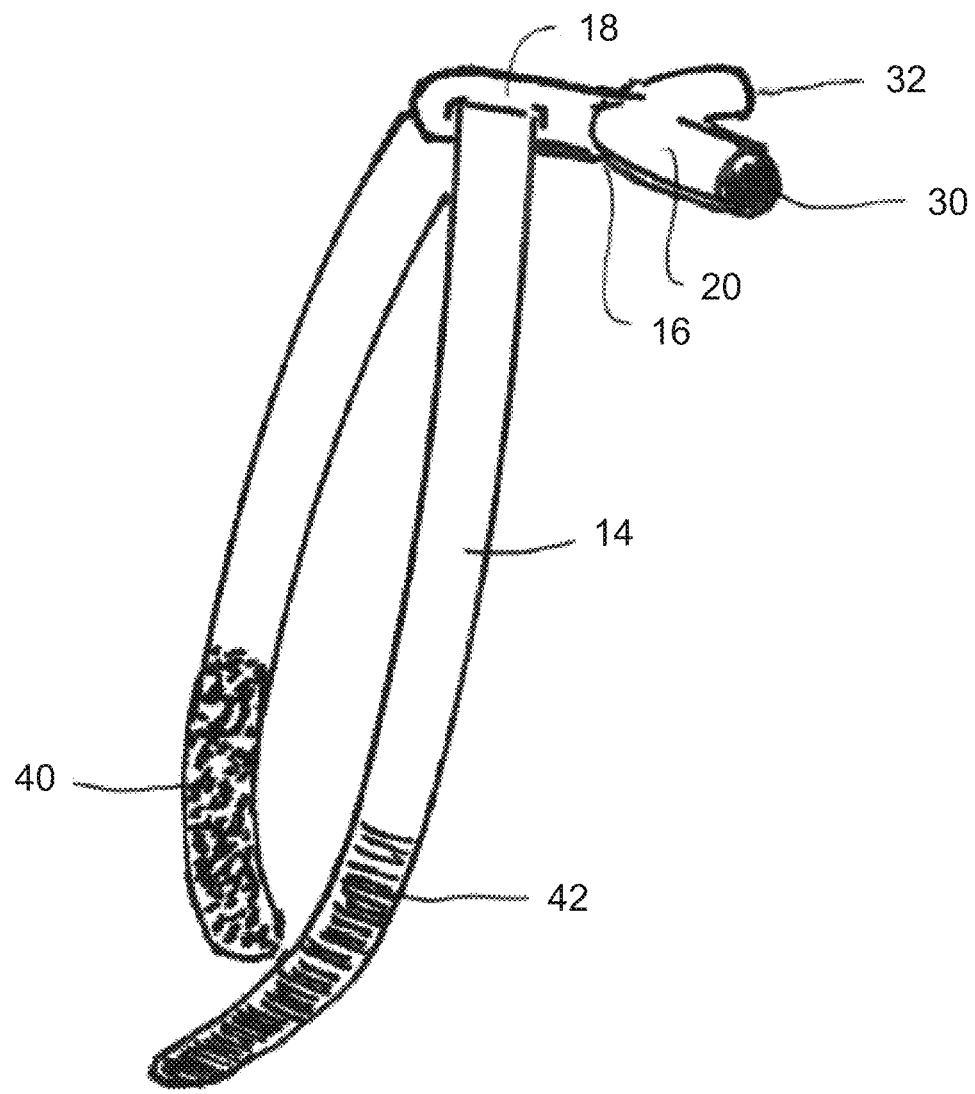
FIG. 5 is a side view illustrating the Y connector attached to a collar with a Velcro™ fastener, according to an embodiment of the present invention.

FIG. 5 is a side view illustrating Y connector 16 attached to collar 14 with a Velcro™ fastener 40, 42, according to an embodiment of the present invention. Male side 40 and female side 42 attach together after adjusting to the neck size of the dog. Collar 14 may also require up to three lengths to support some embodiments for small, medium, and large dog breeds.

Referring to FIG. 1, when dog 50 begins to pull, the human walker need only hold handle 22 firmly. The wrapped portion of leash 22 will tighten around tail 34 of dog 50. The pulling energy applied by dog 50 is transferred to tail 34. If dog 50 persists in pulling, the pulley system of collar/leash combination restraint system 10 forces dog 50 into a sitting position. When dog 50 ceases to pull, the pulley system relaxes the hold around tail 34. The human walker will not be excessively pulled when using collar/leash combination restraint system 10 properly.

FIG. 6 is a flowchart 100 illustrating a process for employing a collar/leash combination restraint system, according to an embodiment of the present invention. The process begins with a user attaching a leash to a ring of a hollow connector at 110. However, in some embodiments, the leash may be permanently affixed to the hollow connector, a collar, or both. The user then wraps the leash around the tail of the dog at 120. The leash may be wrapped any desired number of times.

After wrapping the leash around the tail, the user feeds the leash into one side of the hollow connector and out another side thereof at 130, forming a pulley configuration. When the dog begins to pull, the leash exerts a force on the tail of the dog. This compels the dog to naturally want to assume a sitting position. When the dog ceases pulling, the leash relaxes, and the dog is able to stand and resume walking.

It will be readily understood that the components of various embodiments of the present invention, as generally described and illustrated in the figures herein, may be arranged and designed in a wide variety of different configurations. Thus, the detailed description of the embodiments of the present invention, as represented in the attached figures, is not intended to limit the scope of the invention as claimed, but is merely representative of selected embodiments of the invention.

The features, structures, or characteristics of the invention described throughout this specification may be combined in any suitable manner in one or more embodiments. For example, reference throughout this specification to "certain embodiments," "some embodiments," or similar language means that a particular feature, structure, or characteristic described in connection with the embodiment is included in at least one embodiment of the present invention. Thus, appearances of the phrases "in certain embodiments," "in some embodiment," "in other embodiments," or similar language throughout this specification do not necessarily all refer to the same group of embodiments and the described features, structures, or characteristics may be combined in any suitable manner in one or more embodiments.

It should be noted that reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

The invention claimed is:

1. A system, comprising: a collar; a hollow connector removably affixed to the collar; a ring either directly or indirectly attached to the hollow connector; and a leash attached to the ring and fed through the hollow connector, whereby the leash is wrapped around a tail of a dog and fed through the hollow connector, forming a pulley that discourages the dog from pulling; wherein the hollow connector is removably affixed to the collar via a collar attachment connector; wherein the collar attachment connector comprises at least one fastener configured to secure the collar attachment connector to the collar and further comprises at least one restraint member configured to inhibit motion of the collar attachment connector in a lateral direction with respect to the collar.

2. The system of claim 1, wherein the hollow connector has a "U" shape, a "W" shape, a "Y" shape, or a straight pipe shape.

3. The system of claim 1, wherein an inside of the hollow connector comprises a coating that reduces friction between the hollow connector and a leash.

* * * * *